United States Patent
Maurice

(10) Patent No.: US 11,445,266 B2
(45) Date of Patent: Sep. 13, 2022

(54) SYSTEM AND COMPUTERIZED METHOD FOR SUBTITLES SYNCHRONIZATION OF AUDIOVISUAL CONTENT USING THE HUMAN VOICE DETECTION FOR SYNCHRONIZATION

(71) Applicant: IChannel.IO Ltd., Petah Tikva (IL)

(72) Inventor: Oren Jack Maurice, Yoqneam Moshava (IL)

(73) Assignee: IChannel.IO Ltd., Petah Tikva (IL)

(*) Notice: Subject to any disclaimer, the term of this patent is extended or adjusted under 35 U.S.C. 154(b) by 0 days.

(21) Appl. No.: 17/200,428

(22) Filed: Mar. 12, 2021

(65) Prior Publication Data

US 2021/0204033 A1  Jul. 1, 2021

Related U.S. Application Data

(63) Continuation of application No. PCT/IL2019/051023, filed on Sep. 12, 2019.

(Continued)

(51) Int. Cl.
 *H04N 7/00* (2011.01)
 *H04N 21/488* (2011.01)
 (Continued)

(52) U.S. Cl.
 CPC ......... *H04N 21/4884* (2013.01); *G10L 15/26* (2013.01); *G10L 25/57* (2013.01); *H04N 21/43074* (2020.08)

(58) Field of Classification Search
 CPC ......... H04N 21/4884; H04N 21/43074; H04N 21/233; H04N 21/23418; H04N 21/4307;
 (Continued)

(56) References Cited

U.S. PATENT DOCUMENTS 4,570,232 A * 2/1986 Shikano ............... G10L 15/12
                                              704/241
5,598,557 A * 1/1997 Doner ................. G06F 16/3346
(Continued)

OTHER PUBLICATIONS

International Search Report and Written Opinion of International Searching Authority for PCT/IL2019/051023, ISA/IL, Jerusalem, Israel, dated Jan. 2, 2020.

*Primary Examiner* — Michael B. Pierorazio
(74) *Attorney, Agent, or Firm* — M&B IP Analysts, LLC

(57) ABSTRACT

Audiovisual content in the form of video clip files, streamed or broadcasted may further contain subtitles. Such subtitles are provided with timing information so that each subtitle should be displayed synchronously with the spoken words. However, at times such synchronization with the audio portion of the audiovisual content has a timing offset which when above a predetermined threshold is bothersome. The system and method determine time spans in which a human speaks and attempts to synchronize those time spans with the subtitle content. Indication is provided when an incurable synchronization exists as well as the case where the subtitles and audio are well synchronized. It further is able to determine, when an offset exists, the type of offset (constant or dynamic) and providing the necessary adjustment information so that the timing used in conjunction with the subtitles timing provided may be corrected and synchronization deficiency resolved.

6 Claims, 5 Drawing Sheets

Related U.S. Application Data

(60) Provisional application No. 62/730,556, filed on Sep. 13, 2018.

(51) Int. Cl.
  *H04N 21/43* (2011.01)
  *G10L 15/26* (2006.01)
  *G10L 25/57* (2013.01)

(58) Field of Classification Search
  CPC ............. H04N 21/435; H04N 21/4394; H04N 21/44008; H04N 21/242; G10L 15/26
  See application file for complete search history.

(56) References Cited

U.S. PATENT DOCUMENTS

| | | | | |
|---|---|---|---|---|
| 6,085,160 A * | 7/2000 | D'hoore | ................ | G09B 19/06 704/2 |
| 6,442,518 B1 * | 8/2002 | Van Thong | ............ | G10L 15/26 704/235 |
| 6,473,778 B1 * | 10/2002 | Gibbon | ................ | G06F 40/103 715/201 |
| 7,047,191 B2 * | 5/2006 | Lange | ................... | G10L 15/005 348/468 |
| 7,065,524 B1 * | 6/2006 | Lee | ....................... | G06Q 30/02 |
| 7,092,888 B1 * | 8/2006 | McCarthy | ............. | G10L 15/063 379/88.01 |
| 7,509,385 B1 * | 3/2009 | Rittmeyer | ............ | G06Q 10/107 709/206 |
| 7,729,917 B2 * | 6/2010 | Miyamoto | ............... | G10L 15/22 704/270 |
| 7,739,253 B1 * | 6/2010 | Yanovsky | ........... | G06F 16/9535 707/705 |
| 7,801,910 B2 * | 9/2010 | Houh | ..................... | G06F 16/745 707/765 |
| 7,962,331 B2 * | 6/2011 | Miller | ..................... | G10L 15/01 704/215 |
| 8,121,432 B2 * | 2/2012 | Dorai | .................. | G06F 16/7834 382/276 |
| 8,131,545 B1 * | 3/2012 | Moreno | .................. | G10L 15/04 704/235 |
| 8,423,363 B2 * | 4/2013 | Gupta | ..................... | G10L 15/22 704/255 |
| 8,572,488 B2 * | 10/2013 | Phillips | ............... | G06F 16/4393 715/716 |
| 2002/0055950 A1 * | 5/2002 | Witteman | ............... | G06F 16/40 715/203 |
| 2002/0093591 A1 * | 7/2002 | Gong | .................. | G06F 16/7834 348/515 |
| 2003/0025832 A1 * | 2/2003 | Swart | ................. | H04N 21/2343 348/461 |
| 2003/0061028 A1 * | 3/2003 | Dey | ........................ | G06F 16/40 704/9 |
| 2003/0169366 A1 * | 9/2003 | Lenzi | ....................... | H04N 7/10 348/461 |
| 2003/0206717 A1 * | 11/2003 | Yogeshwar | ............. | G06F 16/71 386/328 |
| 2004/0096110 A1 * | 5/2004 | Yogeshwar | ............. | G06F 16/51 382/239 |
| 2005/0227614 A1 * | 10/2005 | Hosking | ................. | H04N 7/165 455/3.06 |
| 2006/0015339 A1 * | 1/2006 | Charlesworth | ........ | G10L 15/187 704/251 |
| 2007/0124147 A1 * | 5/2007 | Gopinath | ................ | G10L 15/19 704/257 |
| 2007/0124788 A1 * | 5/2007 | Wittkoter | ........... | H04N 21/8133 725/112 |
| 2007/0214164 A1 * | 9/2007 | MacLennan | ............. | G06F 16/90 |
| 2008/0066138 A1 * | 3/2008 | Bishop | ............... | H04N 21/4884 725/137 |
| 2008/0255844 A1 * | 10/2008 | Wu | ....................... | G10L 15/193 704/255 |
| 2008/0266449 A1 * | 10/2008 | Rathod | .............. | H04N 21/8405 348/468 |
| 2008/0270134 A1 * | 10/2008 | Miyamoto | ............... | G10L 15/26 704/251 |
| 2009/0171662 A1 * | 7/2009 | Huang | ................ | G10L 15/1822 704/251 |
| 2010/0091187 A1 * | 4/2010 | Topiwalla | .......... | H04N 21/4858 348/468 |
| 2011/0022386 A1 * | 1/2011 | Gatzke | .................... | G10L 15/26 704/235 |
| 2011/0040559 A1 * | 2/2011 | Kim | ..................... | G10L 21/055 704/231 |
| 2011/0069230 A1 * | 3/2011 | Polumbus | ............. | G06F 16/745 348/468 |
| 2011/0134321 A1 * | 6/2011 | Berry | ................... | G11B 27/322 348/464 |
| 2012/0101817 A1 * | 4/2012 | Mocenigo | ............. | G10L 15/063 704/231 |
| 2012/0253799 A1 * | 10/2012 | Bangalore | ............. | G10L 15/183 704/231 |
| 2013/0254795 A1 * | 9/2013 | Botta | ................. | H04N 21/8456 725/28 |
| 2014/0259084 A1 * | 9/2014 | Polumbus | ............ | H04N 21/278 725/116 |
| 2016/0007054 A1 * | 1/2016 | Polumbus | ............. | G06F 16/683 725/116 |
| 2016/0014438 A1 * | 1/2016 | Xiong | ................. | H04N 21/812 725/32 |

* cited by examiner

SYSTEM AND COMPUTERIZED METHOD FOR SUBTITLES SYNCHRONIZATION OF AUDIOVISUAL CONTENT USING THE HUMAN VOICE DETECTION FOR SYNCHRONIZATION

CROSS-REFERENCE TO RELATED APPLICATIONS

This application is a continuation of PCT Application No. PCT/IL2019/051023 filed on Sep. 12, 2018 which claims the benefit of U.S. Provisional Application No. 62/730,556 filed on Sep. 13, 2018, the contents of which are hereby incorporated by reference.

TECHNICAL FIELD

The disclosure relates to synchronization of an audiovisual content and its subtitles, and in particular the synchronization of the audio signal of the audiovisual content and its corresponding subtitles, and even more particularly when the audio signal is a human voice.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Subtitles, for the purposes of this case, are text files that include timing information that determines when during the presentation of the audiovisual content that it relates to, a particular text segment is to be displayed. The particular text segment is then provided to a renderer that renders the text over the visual content and if properly performed there is synchronization between the actual audio content and the relevant displayed text segment, for example, a translation of the spoken audio, or a transcription thereof. However, for a variety of reasons there may be a constant or inconstant misalignment between the display of the text segments and their respective audio segments. These could be a result of mistakes in the editing of the subtitle files, rendering related issues, misalignments resulting from language translation and others. Misalignment between the text segments and their respective audio segments is bothersome, to say the least, and is considered to be of low quality.

One prior art solution, described for example by Tiedemann in "Synchronizing Translated Movie Subtitles" suggests a synchronization that is done on the basis of aligned anchor points, which is a dictionary-based approach using automatic word alignment. Other approaches suggest various kinds of filters to identify such potential anchor points. Guimarães et al. in "A Lightweight and Efficient Mechanism for Fixing the Synchronization of Misaligned Subtitle Documents" propose two-phase subtitle synchronization framework. This approach uses both anchors as well as audio fingerprint annotation. This requires the enrichment of the subtitle file with additional audio fingerprints and analysis at the first level and then adding the anchors, such as shown in other prior art approaches, so as to fix the presentation of misaligned subtitle entries. In such cases it is necessary to prepare the files, automatically or manually as the case may be, as well as perform complex operations so as to reach the required alignment between the subtitles and the actual audio content. Yet another prior art solution performs time alignment speech recognition such as suggested by Kirby et al. in U.S. Pat. No. 7,191,117. It is therefore desirable to provide a solution that will allow for affordable, simple and real-time lip sync to support the ever increasing demand to resolve the lip sync error problem.

It is therefore desirable to provide a solution that will allow for affordable, simple synchronization between the audio content of an audiovisual content to its respective subtitles so as to support the ever increasing demand to resolve the subtitle misalignment problem.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a system for synchronization of subtitles and human voice segments of an audiovisual content comprises: a human voice analyzer adapted to receive audio content of the audiovisual content and output human voice segments by identifying times where a human voice is present within the audio content; a subtitle analyzer adapted to receive subtitle content of the audiovisual content and output subtitle timing information for each subtitle; a subtitle and human voice misalignment analyzer communicatively connected to the human voice analyzer and to the subtitle analyzer, the subtitle and human voice misalignment analyzer adapted to receive the human voice segments from the human voice analyzer and the subtitles and their respective timing information from the subtitle analyzer and determine therefrom at least a timing delta value between the human voice segments and the subtitles and further determine at least a correction factor; and, a subtitle and audio content alignment unit communicatively connected to the human voice analyzer, to the subtitle analyze and to the subtitle and human voice misalignment analyzer, the subtitle and audio content alignment unit adapted to receive the audio content containing therein the human voice segments, the subtitles and corresponding timing information and the correction factor and output a synchronized subtitles and human voice segments audiovisual content, wherein the correction factor is used to reduce the timing delta value to below a predetermined threshold value.

Certain embodiments disclosed herein include a method for synchronization of subtitles and human voice segments of an audiovisual content comprises: gathering a plurality of audio segments of the audiovisual content; gathering a plurality of subtitles of the audiovisual content; generating a list of possible start offsets and end offsets for the plurality of audio segments and the plurality of subtitles; determine a best cost and a plurality of factor values by performing a calculation on each of the start offsets and end offsets of the plurality of audio segments and the plurality of subtitles; generating a notification that no match has been found upon determination that the best cost is not less than a value defined as infinity; generating a notification that no correction is necessary upon determination that the plurality of factors have each a predetermined value and that the best cost is less than a value defined as infinity; and, performing a subtitle offset correction upon determination that the plurality of factors do not have each a predetermined value and that the best cost is less than a value defined as infinity.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

Figure 1:
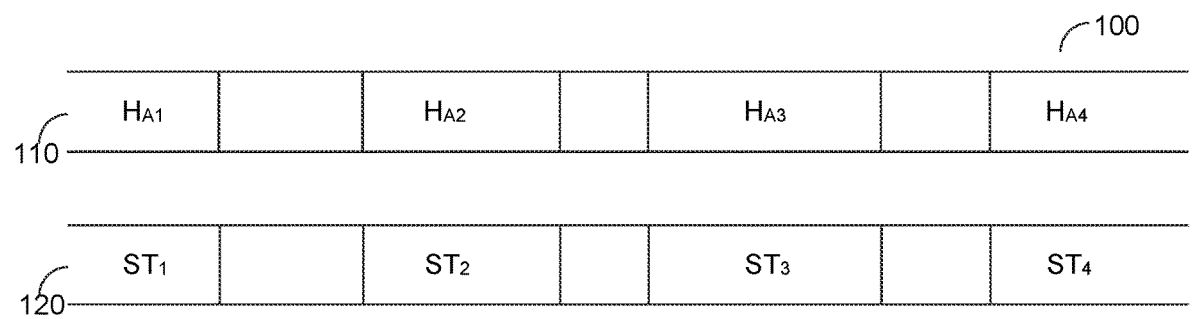
FIG. 1 is a schematic illustration of a synchronized human voice and subtitle streams.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

Audio content, independent or as audiovisual content in the form of video clip files, streamed or broadcasted may further contain subtitles. Such subtitles are provided with timing information so that each subtitle should be displayed synchronously with the spoken words. However, at times such synchronization with the audio portion of the audiovisual content has a timing offset which when above a predetermined threshold is bothersome. The system and method determine time spans in which a human speaks and attempts to synchronize those time spans with the subtitle content. Indication is provided when an incurable synchronization exists as well as the case where the subtitles and audio are well synchronized. It further is able to determine, when an offset exists, the type of offset (constant or dynamic) and providing the necessary adjustment information so that the timing used in conjunction with the subtitles timing provided may be corrected and synchronization deficiency resolved.

Reference is now made to FIG. 1 where an exemplary and non-limiting schematic 100 illustration of a synchronized human voice 110 and subtitle 120 streams. According to a principle of the invention an audiovisual content that is accompanies by a subtitles file first is analyzed to determine human voice segments marked in this case $H_{A1}$ through $H_{A4}$. In the subtitles stream (which may be a stream or a file or any other relevant source of subtitles for the audiovisual content) subtitles are provided together with their respective timing information and are marked $ST_1$ through $ST_4$. The subtitles are received with their respective timing information, for example but not by way of limitation, their start and end time display, or the start time and duration of display. In FIG. 1 it is seen that each of the human voice segments $H_{Ai}$ ('i' being an integer equal to 1 or more) perfectly correspond to a subtitle $ST_j$. This is the case where the system, described in greater detail herein, does not need to perform any kind of subtitle to human voice alignment or synchronization.

Figure 2A:
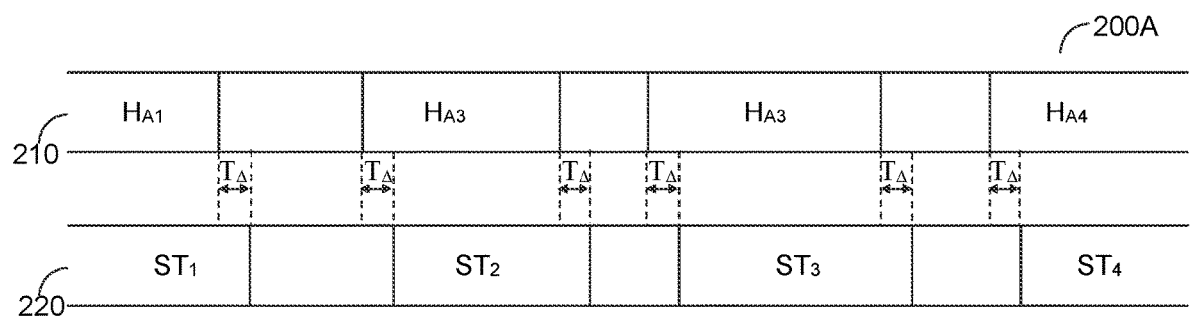
FIG. 2A is a schematic illustration of a first unsynchronized human voice and subtitle streams by a time difference.
Figure 2B:
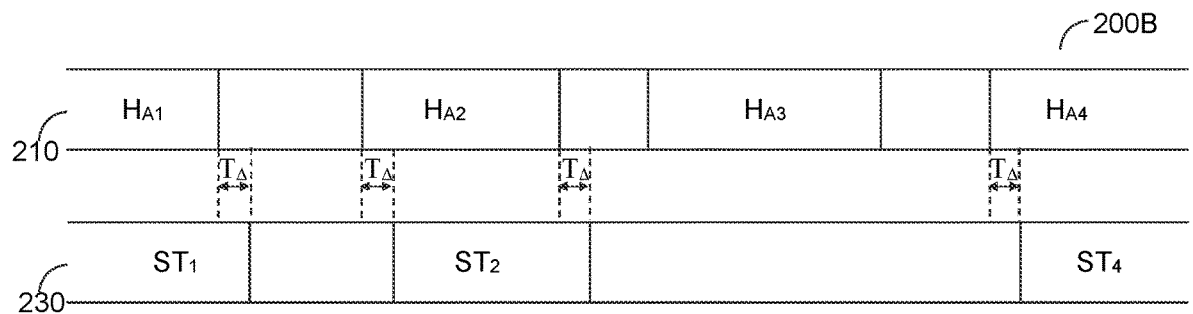
FIG. 2B is a schematic illustration of a second unsynchronized human voice and subtitle streams by a time difference.
Figure 2C:
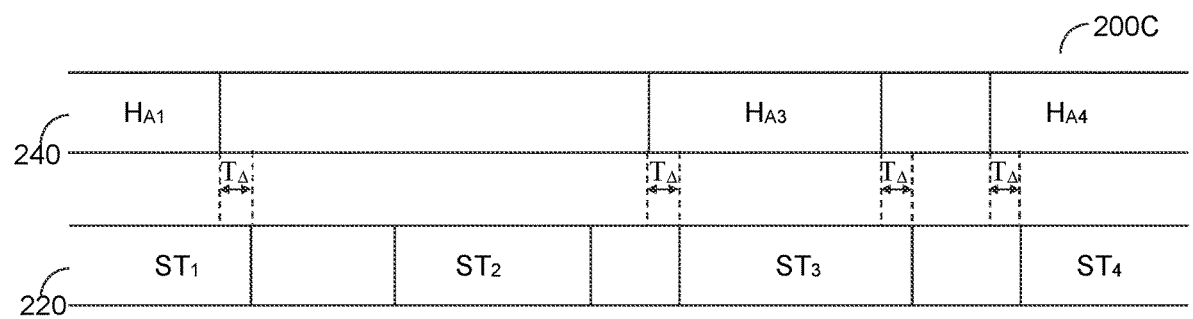
FIG. 2C is a schematic illustration of a third unsynchronized human voice and subtitle streams by a time difference.

Exemplary and non-limiting FIG. 2A illustrates a first 200A unsynchronized human voice 210 and subtitle 220 streams by a time difference marked as $T_A$. As long as $T_A$ is smaller than a predetermined value $\Delta$, then no correction may be required. However, if $T_A$ exceeds the predetermined value $\Delta$, then it is necessary for the system, as explained in more detail herein, to determine and perform a correction to this misalignment between the subtitles $ST_i$ and the human voice segments $H_{Ai}$. While in this particular case each $ST_i$ is shown to be lagging with respect to its corresponding $H_{Ai}$, the case where an $H_{Ai}$ lags a corresponding $ST_i$ is also within the scope of the invention and can be corrected using the same principles. FIG. 2B illustration a second 200B unsynchronized human voice 210 and subtitle 230 streams by a time difference. In this case there is no subtitle provided for the detected human voice $H_{A3}$. This may happen for a variety of reasons and as long as it does not occur beyond a predetermined threshold K, for example no more than 10%, that synchronization may be achieved by simply ignoring these cases and align the available subtitles to their corresponding human voice segments. Reference is now made to FIG. 2C that is an exemplary and non-limiting schematic illustration of a third 200C unsynchronized human voice 240 and subtitle 220 streams by a time difference. This is a similar case to the one shown in FIG. 2B however, in this case there is a subtitles $ST_2$ that does not have a corresponding human voice $HA_2$. This may happen for a variety of reasons and as long as it does not occur beyond a predetermined threshold L, for example no more than 10%, that synchronization may be achieved by simply ignoring these cases and align the available human voice segments to their corresponding subtitles. In all the cases shown with respect to FIGS. 2A-2C a correction factor to $T_A$ is used to ensure synchronization between the human voice $H_{Ai}$ and a corresponding subtitle $ST_i$. It should be noted that if no correlation is found between the subtitles and the audio segments then correction cannot be achieved. According to an embodiment if at least a high enough percent do show a match, for example but not by way of limitation, 90% match, then the correlation may be deemed successful and adjustment between the subtitles and audio possible. In one embodiment it is possible that even if a certain amount of cases exceed $T_{MAX}$ still correction takes place, but not if there are too many of them, i.e., beyond a predetermined threshold value. It should be further noted that while $T_A$ was shown here as being constant this is not necessarily the case. It may also fluctuate around an average of $T_A$ and corrected by a static factor. There is also the case where $T_A$ continuously increases or continuously decreases. In these cases, an adjustment to accommodate for the nature of the increasing or decreasing misalignment may be determined by: $T_c = A + T_o*B$. Where, $T_c$ is the time corrected; $T_o$ is the original time; A is a constant offset value; and. B is a multiplier, typically having a value which is approximately 1. One of ordinary skill in the art would therefore readily appreciate that the error correction may include, but is not limited to, linear drift correction and non-linear drift correction.

Figure 3:
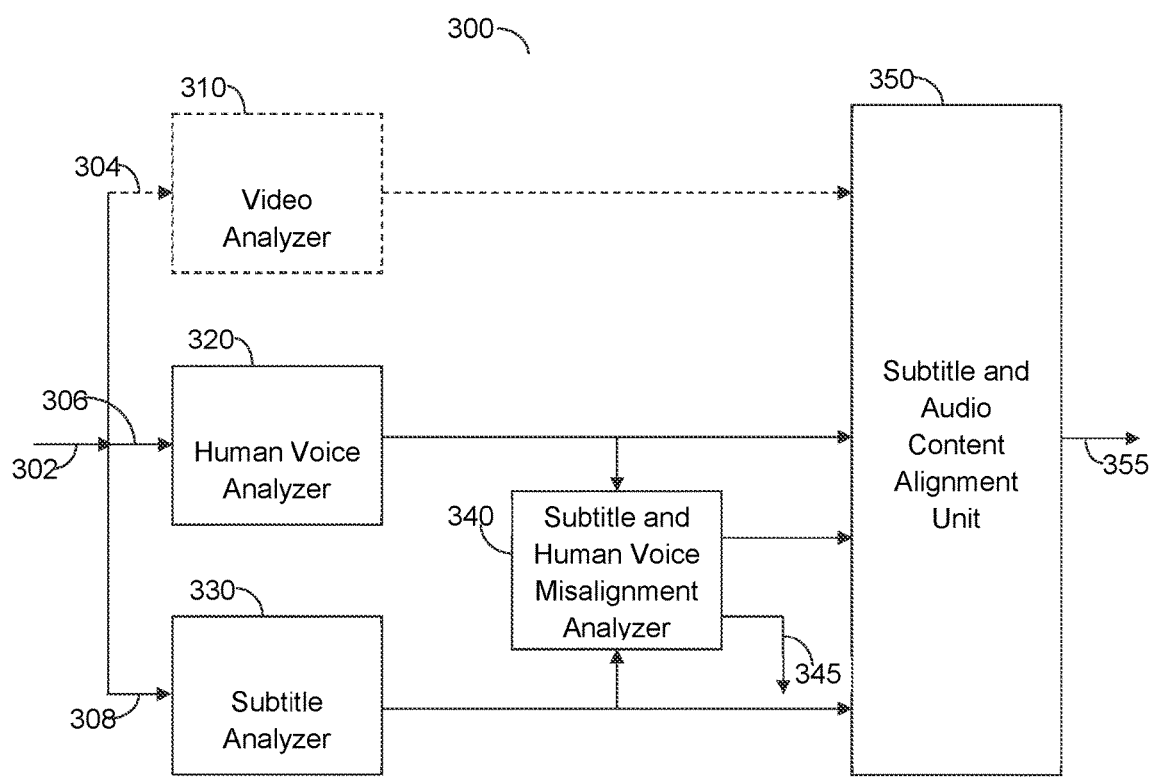
FIG. 3 is a schematic block diagram of a system for synchronization between human voice and subtitles according to an embodiment.

Reference is now made to FIG. 3 where there is shown an exemplary and non-limiting schematic block diagram of a system 300 for synchronization between human voice segments and subtitles according to an embodiment. An audiovisual content 302 provides video content 302 to a potential video analyzer 310 (not discussed within the scope of the invention), an audio content 304 provided to a human voice analyzer 320, and subtitle content 308 provided to a subtitle analyzer 330. As noted above the video analyzer operation 310 is not discussed herein but could be used in accordance with the principles disclosed in a co-pending patent application titled "A System and a Computerized Method for Audio Lip Synchronization of Video Content", filed on the same day and date, assigned to common assignee and hereby incorporated by reference. One of ordinary skill in the art would be readily able to include the operation of the video analyzer 310 for additional synchronization and therefore such explanation is not further elaborated herein. The audio content 302 is provided to a human voice analyzer 320. The function of the human voice analyzer 320 is to analyze the audio content and determine the beginning and end of human voice segments, i.e., segments of the audio content that are identified as containing a human voice. There are known techniques in the art some of which may be found in Gerhard's "Audio Signal Classification: History and Current Techniques" or in Dov et. Al. "Audio-Visual Voice Activity Detection Using Diffusion Maps" providing non-limiting examples of voice activity detection (VAD) methods. From the hearable sounds it is necessary to distinguish speech from other hearable sources of sound that may be music, artificial sounds, natural sounds, and noise. Various spectral analysis techniques may be used separately or in combination for the purpose of extracting the desired human voice segments $H_{Ai}$. Regardless of the technique used, the output of the human voice analyzer 320 is provided to both a subtitle and human voice misalignment analyzer 340 and to a subtitle and audio content alignment unit 350.

Subtitle content 308 are provided as part of the audiovisual content 302 and include the subtitle text as well as timing information. The timing information may include, but is not limited to, the starting time and the end time of a particular subtitle, the starting time and the duration of the particular subtitle, or provide relative time information between one subtitle and the other. Regardless of the particular format, the subtitle content 308 is provided to the subtitle analyzer 330. The subtitle analyzer 330 extracts the timing information for each subtitle segment $ST_i$. The subtitle and human voice misalignment analyzer 340 receive both the human voice segments $H_{Ai}$ and the $ST_i$ segments and respective timing information. It then performs an analysis to determine the nature of the correction and as further explained with respect of FIGS. 4 and 5. Based on the determination, and as further discussed with respect of FIGS. 4 and 5, a set of correction factors may be provided to the subtitle and audio content alignment unit 350. The correction factors may be such that no alignment correction is necessary, such as in the case shown with respect of FIG. 2A, that a correction is needed and may be performed by the system as it is within its capabilities between predetermined thresholds and then providing a set of correction factors to the subtitle and audio content alignment unit 350, which includes the cases shown in FIGS. 2A-2C, or, a determination that correction is not possible and providing an error notification signal on the notification signal 345. Notification signal 345 may further be used to provide other kinds of notifications including that no correction is needed, or when a correction is needed notifying of the type of correction performed. It should be noted, as also mentioned herein that the correction factor may be a constant or, if $T_A$ continuously increases or continuously decreases, a set of correction factors that changes continuously over time.

Figure 4:
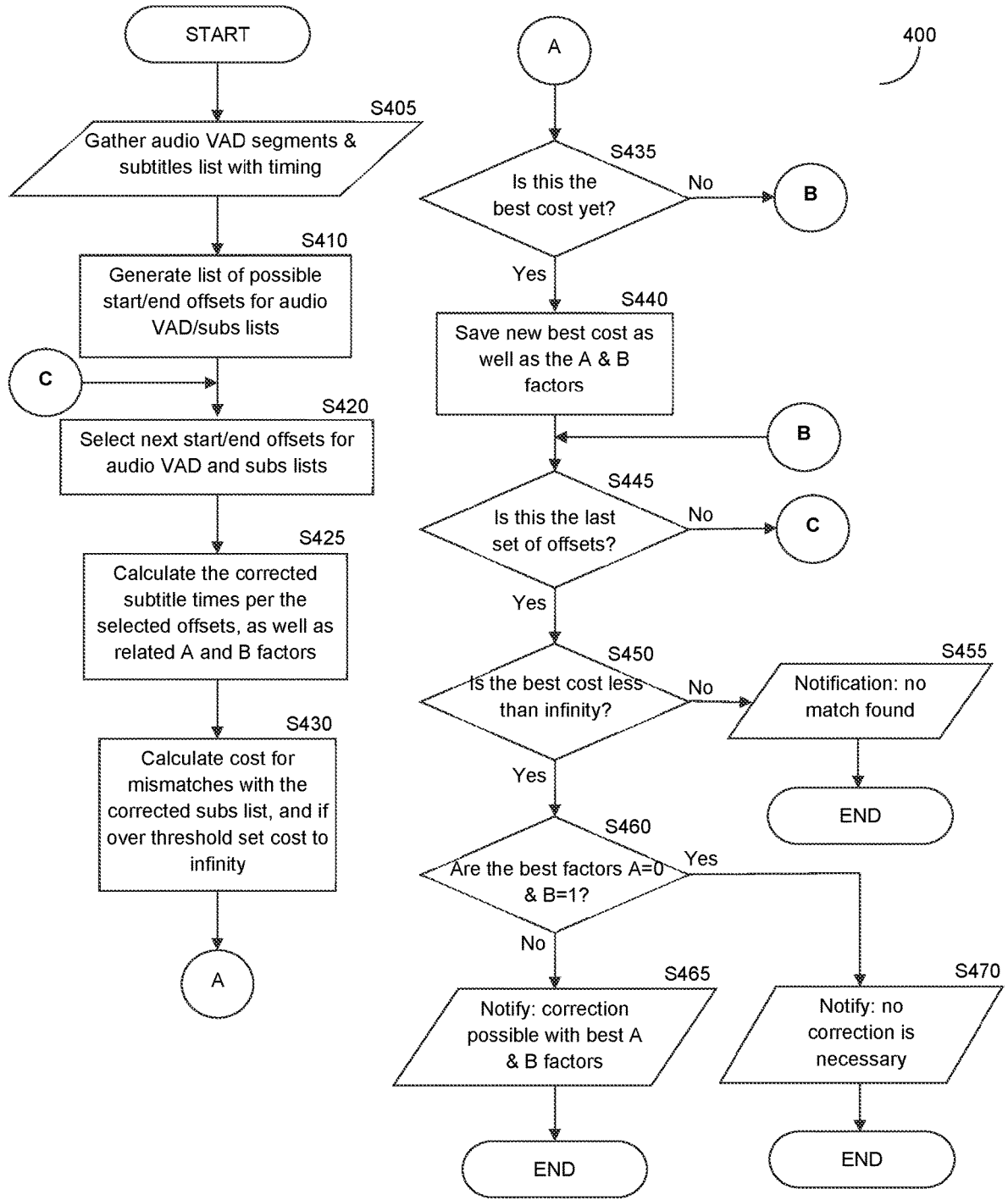
FIG. 4 is a schematic illustration of a flowchart for detection and correction of subtitle and human voice misalignment according to an embodiment.
Figure 5:
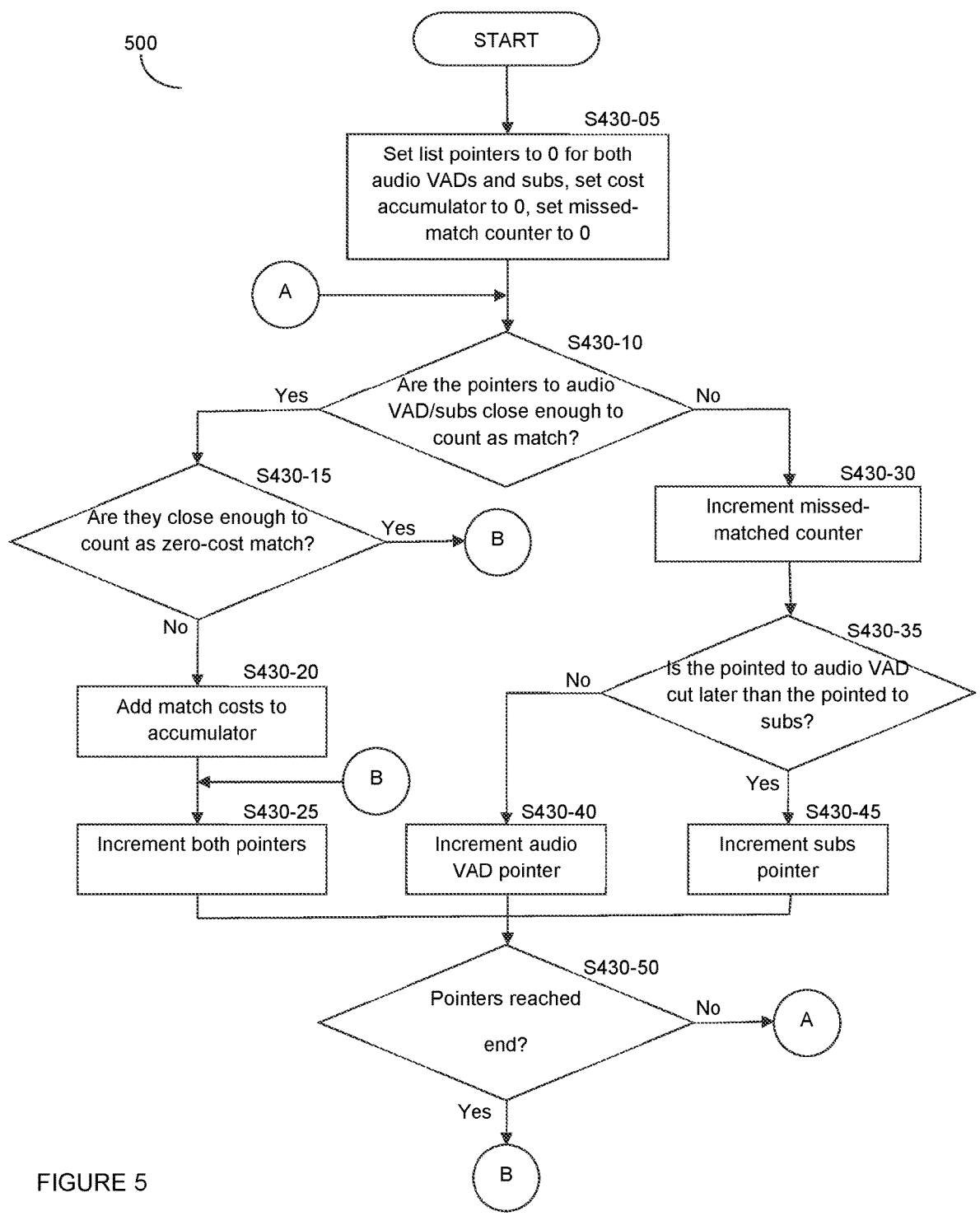
FIG. 5 is a schematic illustration of a flowchart for a cost calculation detail of the method for detection and correction of subtitle and human voice misalignment according to an embodiment.
Figure 5:
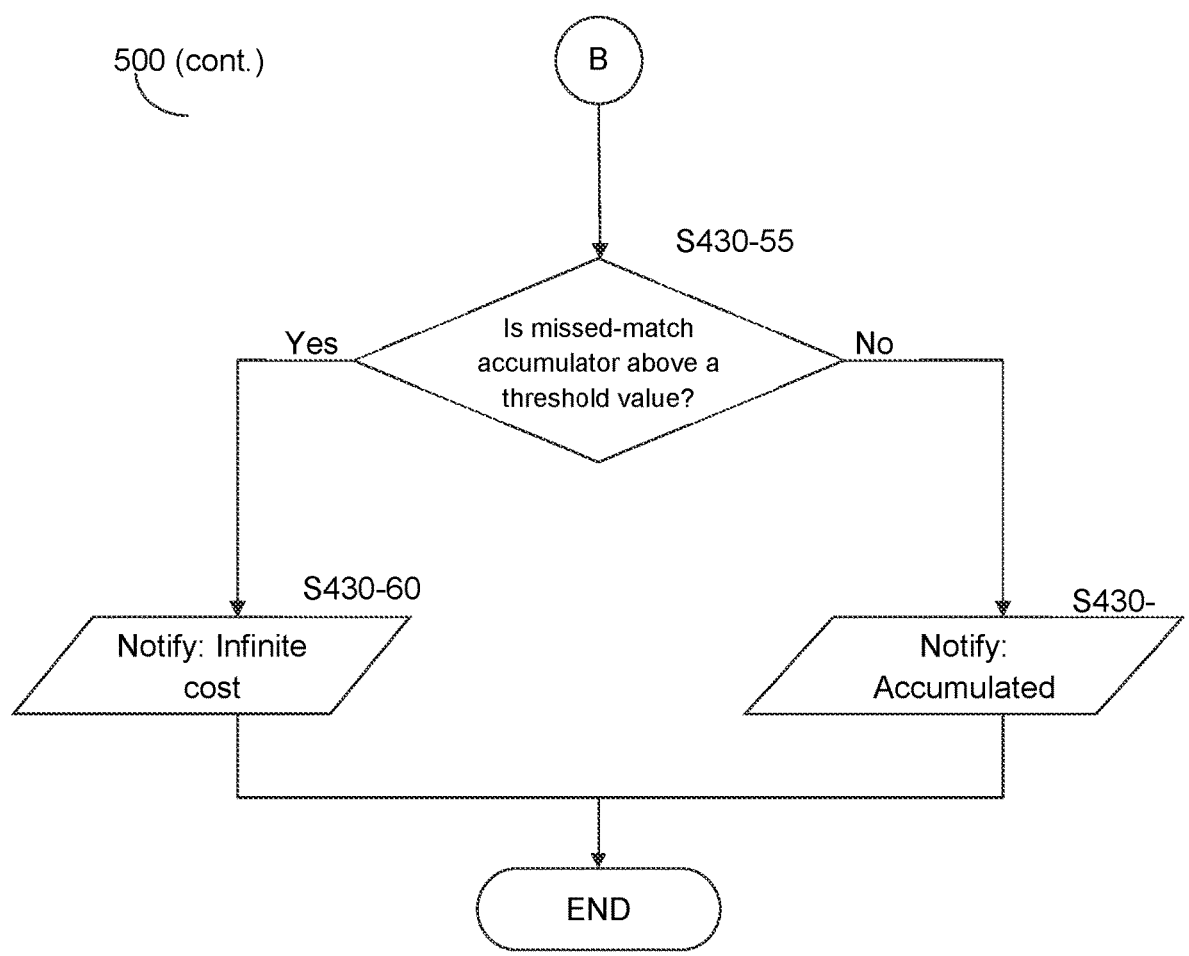

FIG. 4. is an exemplary and non-limiting schematic illustration of a flowchart 400 for detection and correction of subtitle and human voice misalignment according to an embodiment and FIG. 5 is an exemplary and non-limiting schematic illustration of a flowchart 500 for a cost calculation detail of the method for detection and correction of subtitle and human voice misalignment according to an embodiment. The method begins by obtaining a list of audio voice activity detected (VAD) segments and a list subtitles with the timing associated with each subtitle (S405). Each such segment, in either list, has a start time and an end time, signifying the timing and duration of the segment. The VAD segments are detected using, for example but not by way of limitation, prior-art solutions referenced herein. The method then generates a collection start/end audio VAD/sub offsets (S410). Each such set, points to a specific VAD/subtitle (up to a predefined distance from the list's start) as a possible start, for either list, and to another VAD/subtitle (up to a predefined distance from the end of the list) as its end, again from either list. These sets cover all the possibilities for start and end, on either list, resulting in $X^4$ such sets. Thereafter the method initiates the best found cost up to infinity iterating over each of these possible sets (S420), and calculating a A and B factors for each selected set (S425). This is performed as follows: $A_f = S_s - A_s$ and $B_f = (S_e - S_s)/(A_e - A_s)$, where: $S_s$ is the selected "start" subtitle start's time in the specific set; $S_e$ is the selected "end" subtitle end time; $A_s$ the selected "start" audio VAD start time; and, $A_e$ the selected "end" audio VAD end time. Following that, a new list of corrected subtitle timing is determined as follows: $S_s[i] = (S_s[i] - S_s)/B_f - A_f + S_s$ and $S_e[i] = (S_e[i] - S_s)/B_f - A_f + S_s$. Next (S4320) the cost for this set of A,B factors is determined as follows. In s430-05 the cost accumulator is to 0, the number of detected mismatches is set to 0, and pointers inside the list for both audio VAD and subtitles, are set to 0 (Pa=Ps=0). The method then loops over until both pointers reach the end of their lists, preferably following the rest of the steps described with respect of FIG. 5. The distance between the pointed-to segments is determined by $D = |A_s[P_a] - S_s[P_s]| + |A_e[P_a] - S_e[P_s]|$. If (S430-10) the pointed to segments are close enough to count as a match ($D <= D_m$), but not a perfect match ($D > D_p$) (S430-15), the distance between them is added to the accumulated cost (S430-20). Thereafter both $P_a$ and $P_s$ are incremented unless one reached the end of its list, in which case it will not be incremented any further. If the pointed to segments cuts are close enough to count as a perfect match ($D <= Dp$) (S430-15), then execution continues with S430-25 where both $P_a$ and $P_s$ are incremented, unless one has reached the end of its list, in which case it will not be further incremented. In the case where the delta is too big ($D>D_m$) (S430-10), the mismatch counter is incremented (S430-30), and then increment the pointer which is pointing to a segment start time that is "further behind" (unless that pointer reached the end of its list, in which case the other one will be incremented) (S430-35, S430-40, S430-45). Once both pointers reach the end of their respective lists (S430-50), the number of mismatches is evaluated (S430-55). If it is above a predetermined threshold value, the cost of this set is determined to be infinite (S430-60), which is not considered to be a good option. However, if the number of mismatches is below or equal to the predetermined threshold value then the accumulated cost is provided (S430-65). This cost is compared (S435) to the best accumulated cost thus far. If the cost if lower for this set, the new determined cost is saved (S440) as the best cost, and the respective A and B factors are saved as the best factors thus far. Once all the sets have been evaluated (S445), three options exist. The first option is that best cost is still infinity which means that no good match was found (S450), and the user shall be informed the subtitle-sync cannot be corrected (S455). The second option is that the best cost is not infinity, the best A factor is 0, and the best B factor is 1 (S460). The user is therefore informed (S470) that the subtitle-sync appears to be perfect as-is and no correction is necessary. The third option is that the best cost is not infinity, but the best factors differ from $A_f=0$ or $B_f=1$ (S460). The user is then informed (S465) that the subtitle-sync is not good, but can be corrected by applying these factors to the subtitles.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. medium is any computer readable medium except for a transitory propagating signal.

What is claimed is:

1. A method for synchronization of subtitles and human voice segments of an audiovisual content comprises:
    gathering a plurality of audio segments of the audiovisual content;
    gathering a plurality of subtitles of the audiovisual content;
    generating a list of possible start offsets and end offsets for the plurality of audio segments and the plurality of subtitles;
    determine a best cost and a plurality of factor values by performing a calculation on each of the start offsets and end offsets of the plurality of audio segments and the plurality of subtitles;
    generating a notification that no match has been found upon determination that the best cost is not less than a value defined as infinity;
    generating a notification that no correction is necessary upon determination that the plurality of factors have each a predetermined value and that the best cost is less than a value defined as infinity; and
    performing a subtitle offset correction upon determination that the plurality of factors do not have each a predetermined value and that the best cost is less than a value defined as infinity.

2. The method of claim 1, wherein the plurality of audio segments were created using a voice activity detection technique.

3. The method of claim 1, wherein a first factor of the plurality of factors has a value of '0' and a second factor of the plurality of factors has a value of '1'.

4. The method of claim 1, wherein performing a calculation on each of the start offsets and end offsets of the plurality of audio segments and the plurality of subtitles comprises repetition of:
    selecting a start offset and an end offset of an audio segment and a subtitle;
    calculating a corrected subtitle time per the selected offsets;
    calculating the plurality of factors for the selected offsets;
    calculating cost for mismatches and if it is over a predetermined threshold value set the cost to infinity;
    save the calculated cost and the plurality of factors upon determination that this is the best cost;
    until all the start offsets and the end offsets of the audiovisual content and subtitles have been selected.

5. The method of claim 1, wherein the offset is a linear drift.

6. The method of claim 1, wherein the offset is a non-linear drift.

* * * * *